United States Patent [19]

Tummarello

[11] 4,027,711

[45] June 7, 1977

[54] MEANS FOR MOUNTING CONCRETE STRUCTURAL MEMBERS

[76] Inventor: Natale J. Tummarello, 2073 Hillside Ave., Bellmore, N.Y. 11710

[22] Filed: Apr. 23, 1976

[21] Appl. No.: 679,811

Related U.S. Application Data

[63] Continuation-in-part of Ser. No. 415,159, Nov. 12, 1973, abandoned.

[52] U.S. Cl. .............................. 151/41.7; 52/105; 52/707
[51] Int. Cl.² ...................... F16B 5/02; F16B 39/00
[58] Field of Search .......... 151/41.7, 41.76, 41.73, 151/41.75, 37, 41.5; 52/105, 707, 704, 710, 701, 758 F; 248/25; 285/93

[56] References Cited

UNITED STATES PATENTS

| | | | |
|---|---|---|---|
| 2,493,527 | 1/1950 | Carey | 151/41.5 X |
| 2,953,874 | 9/1960 | Kindorf | 85/1 R X |
| 3,005,292 | 10/1961 | Reiland | 151/41.75 X |
| 3,640,328 | 2/1972 | Tummarello | 151/41.7 |

*Primary Examiner*—Ramon S. Britts
*Attorney, Agent, or Firm*—James P. Malone

[57] ABSTRACT

Adjustable means for fastening heavy precast concrete panels for walls or floors, structural concrete beams, girders, and machinery to foundations vertically, horizontally, or in any plane. An internally threaded hollow member is anchored to a panel member which is to be mounted on a supporting structure with bolts; the member having numerous fastening points designed into it. Alternatively, the hollow member is placed into a foundation so machinery can be bolted down. An externally threaded hollow member which can rotate through 360° is mounted in the threads of the first hollow member, and is axially adjustable therein, the second member having a tapering hollow interior keyway space extending perpendicular to the axis of the second member. The upper three-quarters of the tapered keyway sides have fine thread-like striations and a tapering internal threaded nut fits into the hollow tapering space, the nut having corresponding striations on its tapering sides. Now both tapering hollow keyway and tapering nut inserted into it can be rotated 360°, and by magnetic means, the tapering nut can be moved along the entire length of keyway and the nut held at any location or attitude therein by magnetic means. Upon alignment of tapering internally threaded nut and bolt through a hole in a structural member, the bolt will pull the nut up in tapering hollow member securing the concrete panel to structure.

4 Claims, 10 Drawing Figures

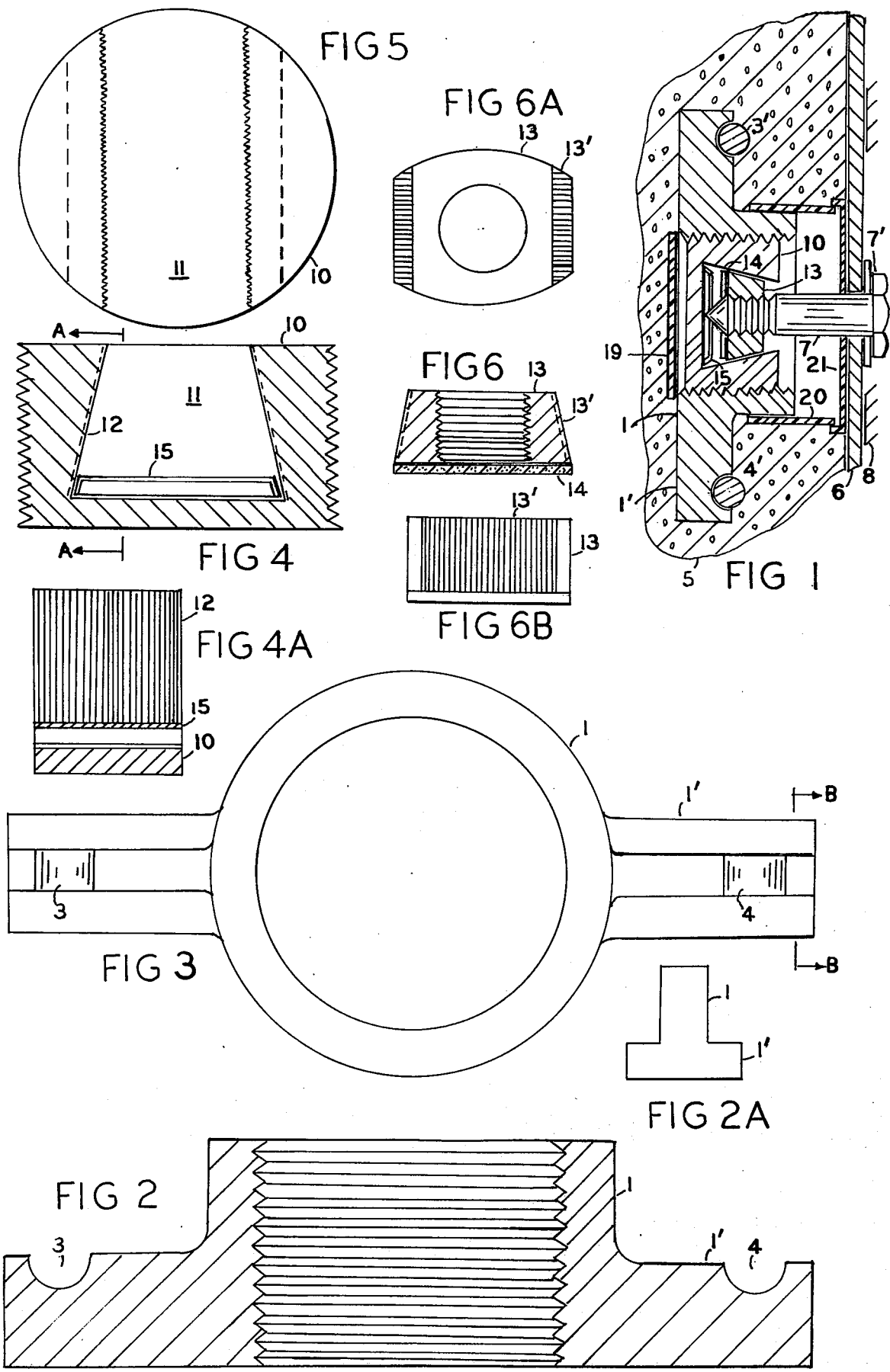

MEANS FOR MOUNTING CONCRETE STRUCTURAL MEMBERS

This application is a continuation-in-part of my prior application, Ser. No. 415,159, filed on Nov. 12, 1973, of the same title, now abandoned.

This invention relates to means for mounting precast panels, prestressed panels, prestressed concrete structural members such as beams, and girders, or for anchoring heaving machinery to a floor or foundation.

More particularly, the invention relates to mounting large heavy precast concrete panels or prestressed structural concrete members or other heavy components such as heavy machinery to foundations which have numerous fastening points determined by engineering calculations and design that are shown on blueprints and shop drawings sent to fabricators and to job site.

This Application is a further improvement of my U.S. Pat. Nos. 3,425,474; 3,640,328 and 3,620,277.

The alignment of numerous points of fastening between members is a difficult task, very frustrating, and very expensive as a gang of men wait about with machinery such as a crane, with a wall panel suspended mid-air as one man trys to align a bolt through a hole into a fastening device imbedded in a panel to be fastened to steel frame or concrete beam of building. This fastening device will facilitate all of this. An internally threaded hollow member is set and cast into a concrete member which is to be mounted on a supporting structure with bolts or placed into a foundation so that machinery can be bolted or placed into main structural members so that secondary structural members are joined by bolts. An externally threaded member with a dovetail slot cut perpendicular to its axis which can rotate through 360° is mounted in the threads of said first member and second member can adjust axially therein. The sizing of keyway and nut in relation to each other is such that, the angle of tapering on both the keyway and tapering nut is the same. However, the length of the tapering sides of the kewyway are longer than the tapering length of the nut. The taering nut fits the tapering keyway near the top of the keyway as the bolt moves tapering nut into keyway. The dimension of the tapering nut is greater than the top of the keyway thus preventing the nut from being pulled through the top of the keyway.

Internally threaded tapering nut is able to move along the length of the keyway and both the second member with the slot and the tapering nut can rotate through 360° up or down its axis into the first member and all the time the tapering nut is free to be moved the length of the dovetail of the second member. The tapering contact surfaces of the keyway and tapering nut have a fine slight depth thread-like striations. The striations are only in the upper three-quarter portion of tapering keyway and the tapering nut surface is fully striated. Magnetic means are provided so that the dovetailed nut can be held near the bottom of the dovetailed keyway and movable along the length of the dovetail keyway of the second member. The second member and tapering nut can be moved into approximate position by visible observation and necessary adjustments made prior to thread contact. Final alignment will be made by the self-centering bolt when thread contact has been made by the bolt into the threaded dovetail nut. The nut will be moved up by the bolt bringing dovetailed surfaces of nut against dovetail surface of keyway and interlock the situations on the nut and keyway. The bolt is tightened until both surfaces are locked and can now carry the load imposed upon them. Thus the magnetic means has accomplished its intended purpose of holding the nut near the bottom of the keyway on formed sheetmetal piece while the second member was moved through circle and the tapering nut moved in the keyway until alignment was accomplished. This can be repeated any number of times until all fastening points are secured.

Numerous fastening points cannot be so accurately measured and aligned between connecting structural members without some slight misalignment resulting, this anchoring device eliminates the problem by its combination of adjustable features.

The invention is not limited to any one plane of mounting, it can be perpendicular, horizontal, overhead, ceiling, floor, etc. The magnetic means incorporated into the invention will hold internally threaded tapered nut toward the bottom of tapered slot of externally threaded second member which in turn is screwed into the internally threaded hollow first member set at predetermined depth into precast concrete panel or machinery foundations.

A plastic cylinder of determined length with a cover at one end is tightly placed around perimeter member one set into form at anchoring point and cast into precast panel or foundation for the required number of anchoring points. The length of the plastic cylinder will be determined by the thickness of concrete panel, i.e., 3 inches, 4 inches, etc., or to any desired depth on machinery foundation thereby getting ultimate tensile strength from the anchoring device and concrete by increasing the cone pullout strength of the concrete by placing anchoring insert at maximum depth good design will allow.

In my U.S. Pat. Nos. 3,425,474; 3,507,315 and 3,620,277, the mounting nut is adjustable in one plane only. In my U.S. Pat. No. 3,640,328, the mounting nut also adjusts in and out along its axis. However, the present improved invention has a dovetailed keyway and a dovetailed tapering nut which is much stronger, positive, and stable anchoring device compared to keyway and nut in my U.S. Pat. No. 3,640,328. The dovetail combinations tensile strength is greater than the prior keyway and nut which depends on lips to hold the nut which can be sheared off much easier. The dovetail combination once taken up by bolt is more stable under tension once tightened, than keyway and nut in U.S. Pat. No. 3,640,328.

The present application provides an improved dovetail lock between a tapering nut and an internally tapering hollow member. The tapering nut having on its tapered surfaces very fine thread-like striations and the same type of striations ofn the internally tapered hollow surface. However, on the latter surface, the striations would preferably be on upper three-quarter portion of hollow tapered surface, allowing the nut to move in the keyway near the bottom portion held there by magnetic means attached to the nut and moving along the sheetmetal in the keyway. Upon bolt pulling nut up from sheetmetal in the lower section to the tapering keyway, the dovetailed surfaces would become engaged and fine striations would interlock with the opposite striated dovetailed surface giving the dovetailed surfaces even greater stability against surface slippage plus the strength of dovetail.

For economical reasons, many large buildings are being built with the entire envelope walls faced with large precase concrete panels versus walls of brick units and small pieces of bonded stones. These large and heavy panels are prefabricated in casting yards with mounting devices incorporated or imbedded in interior face of panel at designated points on panel surface to correspond with structural members with mounting holes on steel beams or concrete beams in frame of buildings so that when the panel is lifted by crane at a job site, the panel by means of bolts is secured to structural frame of the building.

The present invention provides fastening means which adjusts laterally and along its axis and through 360° so as to be readily and positively aligned with hole in channel iron attached to structural frame although slight variation and error exists in the alignment of numerous points of fastening which are beyond human control. The magnetic feature holds the tapering internally threaded nut in tapering keyway which is perpendicular to axis of externally threaded member which is screwed into anchored internally threaded hollow member imbedded into precast concrete panel. The tapering internally threaded nut would have close, fine thread-like striations on its tapering surfaces. The keyway in externally threaded hollow member having the same angle of taper as nut and its tapered sides surface would be striated the same as the nut, except that striations would be only on upper three-quarters of its sides. In the sizing of the keyway and nut in relation to each other, the angle of taper on both the keyway and the tapering nut is the same, however, the length of the tapered sides of the keyway are longer than the length of the tapering nut. The tapering nut fits the tapering keyway near the top of the keyway as the bolt moves the tapering nut up into the keyway. The dimension of the tapering nut being greater than the top of the keyway thus preventing tapering nut from being pulled through the top of the keyway. After rotating member 2, with the tapering nut in the keyway, into the member 1, imbedded into the panel or foundation by threadng one into the other, and positioning the keyway at necessary angle of the 360° and moving the tapering nut with magnet along the sheetmetal in the keyway for approximate positioning for bolting alignment through the hole in the structural member on steel or concrete beam or hole in machinery base. The self-centering bolt will now make final adjustment and make thread contact with the tapering nut, pulling the tapering nut and magnet off sheetmetal in bottom of the keyway thus dovetailing the surfaces of the keyway and the tapering nut at the same time interlocking striations on both surfaces so as to assure the strength of the dovetail surface plus the added stability against the movement of the tapering nut in the tapered keyway.

Accordingly, a principal object of the invention is to provide new and improved means for mounting precast concrete panels or members to a supporting structure.

Another object of the invention is to provide new and improved means for adjustably mounting precast panels or structural members to the frame of a building.

Another object of the invention is to provide new and improved means for adjustably mounting precast concrete members comprising a nut member which is adjustable along three orthagonal axes.

Another object of the invention is to provide new and improved means for fastening wall panels, structural concrete beams, girders, machinery and equivalent members to a supporting structure comprising, an internally threaded hollow member, said member being anchored to a member which is to be mounted on a supporting member with bolts, an externally threaded hollow member mounted in the threads of said first member, and being axially adjustable therein, said second member having a tapering hollow interior space perpendicualr to its axis, a tapering internally threaded nut mounted in said tapering interior space, the degree of taper being the same on said nut and said hollow space, the depth of the tapering sides being greater on hollow spaced member than length of taper on the nut so that nut will move near bottom of hollow space, freely movable with hollow member during adjustment therein, the width of nut at top of taper being greater than width of taper at top of hollow member, so nut is held in keyway when bolt moves nut, to thereby movably mount said tapering nut and tapering hollow keyway throught the 360° of circle, the nut being movable the length of keyway, while tapering hollow member with the keyway and nut is threadedly moved in anchored internally threaded hollow member to align thread of tapering nut with hole of structural supporting member through which self-centering bolt passes and threadedly engages nut.

These and other objects of the invention will be apparent from the following specifications and drawings, of which:

FIG. 1 is a sectional view of an embodiment of the invention.

FIG. 2 is a sectional view of the first internally threaded hollow member.

FIG. 2A is an end sectional view of FIG. 3, along the line B—B.

FIG. 3 is a top view of FIG. 2.

FIG. 4 is a sectional view of the hollow externally threaded member showing light guage sheetmetal piece on which magnet and nut move.

FIG. 4A is a sectional view along A—A of FIG. 4. Note that the striations on member 10, do not extend to the bottom of the keyway.

FIG. 5 is a top view of FIG. 4.

FIG. 6 is a sectional view of the locking nut assembly showing 14 as magnetic material attached to the bottom.

FIG. 6B is a side view of FIG. 6.

Referring to the figures, the invention generally comprises an internally threaded hollow member 1, which has an extending foot or anchor portion 1'. The anchor portion preferably has a "T" shaped cross section, as shown in FIG. 2A, and preferably has a pair of notches 3 and 4, for receiving reinforcing bars 3' and 4', for the purpose of securely anchoring the member 1, in the concrete wall panel 5, which is to be mounted on the structural supporting member 6, by means of centering bolt 7. The structural supporting member 6, is mounted on a structural member 8, for instance, an H bean or reinforced concrete column.

An externally threaded member 10, is threadedly mounted in member 1. The member 10, has a tapering hollow interior 11, with striations 12, close and slight in depth, which only cover three-quarters of the length of taper from top of member 10, toward the bottom of the keyway.

The nut 13, may be slid inside the hollow space and held toward the bottom of the keyway, by magnet attached to it and magnetically attached to ferrous sheet metal 15, formed to fit the bottom of the keyway as shown in FIG. 4. The nut 13, can be moved along the length of the keyway and held where moved by the magnet. The nut 13, also has striations similar as member 10, running the full depth of tapered sides. The magnet 14, may be a plastic sheet impregnated with magnetic particles distributed throughout sheet and magnetic particles polarized. The nut 13 can move the length of hollow space 11, and the tapered keyway can be threadedly rotated throught 360° of the circle with the nut 13, held anywhere in the keyway by magnetic force of the magnet 14, as member 10, rotates in and out of member 1. By approximately aligning the keyway and the nut with reference to hole 7', in structural member 6, the self-centering bolt 7, will make final adjustment of the keyway and the nut completing the threading of bolt 7, into the nut 13, pulling the nut up in the keyway, thus dovetailing the nut into the keyway. Just prior to completion of dovetailing of the surfaces of member 10, and the nut 13, the striations will interlock on surfaces of 12 and 13', assuring the stability of nut 13, in keyway 11, and with final tightening of bolt 7, into nut 13, against the strength of the dovetail joint.

The invention can make the alignment of many points of fastening readily easy and without waste of time and money. A plastic cylinder 20, and plastic cover 21, are mounted on member 1, and plastic cover 19, is set on the bottom of member 1. The plastic will exclude concrete mix from entering device while pouring panel. When concrete sets, cover 21, can be removed, and members 10 and 13 placed into member 1. Plastic cylinder can be color coded for various depths, 3", 4", 5", etc., and likewise for foundation of machinery, thus, obtaining the maximum penetration of anchoring member in concrete mass from mounting face of panel. This enables the device to obtain the greatest cone of pullout for the device from concrete panel; obtaining the greatest possible tensile strength of device and panel thus requiring fewer fastening points and anchoring devices.

In other words, the member 1, 15, 19, 20 and 21, is set in concrete form placing reinforcing bars 3' and 4', in 3 and 4, in T sectioned footed anchor on member 1, at designated location for panel 5, and concrete panel is poured. Panel 5, is removed from form and cured and then shipped to job site. Member 10, with members 13 and 15, nut 13 and magnet 14 are in member 1. Panel 5 is lifted by crane to be mounted on structural member 6, by first locating and aligning as closely as possible with hole 7', by visible alignment.

The nut 13, and hollow keyway 11, of member 10, can be rotated through 360 degrees and nut 13, with magnet 14, moving along the length of keyway 11, on sheetmetal 15, therefore allowing self-centering bolt 7, to make thread contact with nut 13, moving it with magnet 14, away from sheetmetal 15, and by tightening up bolt, dovetailing nut 13, into member 10, tapered sides, and at the same time engaging the striations, completing the dovetailing and the striations insuring the stability of nut 13 in member 10. The bolt will penetrate sheetmetal 15, if necessary, as it is of very light gauge. The length of plastic cylinder 20, is predetermined by depth of panel 5; for each depth of panel desired, cylinder and cover can be color coded for precasting plant, for elimination of possible error, in selection of correct cylinder.

I claim:

1. Means for fastening wall panels, structural concrete beams, girders, machinery and equivalent members to a supporting structure comprising,
    an internally threaded hollow first member, said member being anchored to a member which is to be mounted on a supporting member with a self-locking bolt,
    an externally threaded hollow member mounted in the threads of said first member, and being axially adjustable therein, said second member having opposed, substantially planar internal tapering surfaces defining a tapering hollow interior dovetailed keyway perpendicular to its axis, an internally threaded nut having opposed, substantially planar external tapering surfaces mounted in said tapering keyway, the degree of taper being the same on said nut and said keyway, the depth of the tapered extent of the hollow member beng greater than the; length of taper on the nut so that the nut will move near the bottom of hollow space and will be freely movable within the hollow member during adjustment therein, the width of the nut at the top of the taper being greater than the width of the taper at the top of the hollow member, so that the nut is held in the keyway when the bolt moves the nut in the axial direction, said tapering nut being movably mounted within said tapering hollow keyway throughout 360°, the nut being movable the length of the keyway, while the tapering hollow member with the keyway and the nut is threadedly moved in the anchored internally threaded hollow member to align the thread of the tapering nut with a hole of a structural supporting member through which the self-centering bolt passes and threadedly engages nut, the tapered walls of said hollow member having first substantially axially extending, straight thread-like striations thereon, said striations being relatively minute and being only on the upper three-quarters portion of said surfaces, second identical striations on the full tapering surfaces of said nut whereby said nut surfaces may interlock in the tapering striated surfaces of said hollow member as the bolt moves the nut up to locking tapering surfaces and interlocking striation, thus gaining the strength of the dovetailed keyway and stability through interlocking of the striations, and means for maintaining the nut in a desired position along the length of the keyway.

2. Apparatus as in claim 1, wherein said means comprise material attached to the bottom of said nut and light guage sheetmetal connected to the bottom of said hollow member, the nut thus being able to attain and hold any position along the keyway length and being movable for alignment with the thread of the self-centering bolt, the nut being moved by the bolt from the sheetmetal for final dovetailing.

3. Apparatus as in claim 2, having cover means of predetermined length to pre-set the depth of said first member within a masonary member or foundation.

4. Apparatus as in claim 3, wherein said cover means is color coded for predetermined depths simplifying installation and eliminating possible errors during fabrication.

* * * * *